(12) United States Patent
Bosich (10) Patent No.: US 6,729,828 B2
(45) Date of Patent: May 4, 2004

(54) LOAD CARRYING VEHICLE

(76) Inventor: Milan Edgar Bosich, 4 Esk Road, City Beach (AU), 6015

( * ) Notice: Subject to any disclaimer, the term of this patent is extended or adjusted under 35 U.S.C. 154(b) by 0 days.

(21) Appl. No.: 09/820,639

(22) Filed: Mar. 30, 2001

(65) Prior Publication Data

US 2001/0026753 A1 Oct. 4, 2001

(30) Foreign Application Priority Data

Apr. 3, 2000 (AU) .............................................. PQ6655

(51) Int. Cl.7 ................................................. B60P 1/18
(52) U.S. Cl. ...................... 414/476; 414/482; 280/414.5
(58) Field of Search ................................ 414/471, 474, 414/476, 482, 483; 280/414.5, 43.17

(56) References Cited

U.S. PATENT DOCUMENTS

| | | | |
|---|---|---|---|
| 2,774,612 A | * 12/1956 | Evans | |
| 2,861,811 A | * 11/1958 | Lassen | ................... 280/43.17 |
| 3,000,523 A | 9/1961 | Nicolas | |
| 3,119,502 A | 1/1964 | Paul | |
| 3,346,131 A | 10/1967 | Lundell | |
| 3,701,445 A | * 10/1972 | Haslem | |
| 4,122,963 A | 10/1978 | Berglund et al. | |
| 5,366,336 A | 11/1994 | Friesen et al. | |

* cited by examiner

*Primary Examiner*—James W. Keenan
(74) *Attorney, Agent, or Firm*—Rothwell, Figg, Ernest & Manbeck, PC (57) ABSTRACT

A load carrying vehicle body with a chassis is provided which has a forward support and a rearward support, and which is able to accommodate a load. The rearward support includes a pair of support members each with at least one wheel mounted to one side of a support member. The support members are movable on the chassis between a first position at which the wheels are located within the tracking width of the vehicle and at which the wheels are aligned with the direction of travel of the vehicle, and a second position at which the wheels are displaced laterally from the tracking width to provide access to the rear of the chassis. A first lock is provided between the support members which is able to be interengaged when the support members are in the first position to maintain the wheels in the first position and to enable the support members to cooperate with each other in accommodating the stresses and load exerted thereon when in the first position.

28 Claims, 7 Drawing Sheets

LOAD CARRYING VEHICLE

FIELD OF THE INVENTION

The present invention relates to a load carrying vehicle.

A particular application of the vehicle relates to one which can be used for the transportation of heavy loads and which facilitates the loading of those heavy loads onto the vehicle.

Throughout the specification the term "tracking width" shall be taken to mean the usual width of the vehicle in its movement over the ground.

BACKGROUND

In the transportation of large heavy loads such as earth-moving equipment it is conventional practice to use low loader trailer vehicles which are supported on a multiplicity of tyres. The tyres are of necessity of small diameter in order for them to be able to fit beneath the platform. In this regard it is quite common to use 32 wheels arranged in 4 rows of eight. In such an arrangement a complex control system for load-equalisation interconnects the wheels to ensure that the load is spread as evenly as possible over all of the wheels over a range of uneven road conditions for each wheel set. Such a practice has presented a number of disadvantages which include the feature that the control system cannot function effectively over a sufficient range of wheel travel to be able to accommodate severe road irregularities which results in tyre and suspension damage. In addition the spread of support over such a large area results in severe tyre scrub during cornering which also results in damage to the tyres and the suspension components. In addition the use of a large number of wheels which are each provided with their own suspension system and in many cases their own braking system presents a significant maintenance problem. In addition the use of a large number of small brakes leads to problem of uniform application. Furthermore the braking systems that are used are generally unsuited to continuous application on downgrades since they overheat quickly and it is a common characteristic of such vehicles that they are applied continuously for lengthy periods of time, As an alternative to the above arrangement there have been proposals put forward to support a low loader trailer at its forward end from the prime mover vehicle and from two sets of wheels at its rear end where the rear sets of wheels are supported to be able to pivot away from the rear of the vehicle to permit access to the trailer by a load. In such a case the wheels can be large and of a high carrying capacity since they do not have to be able be received under the vehicle. Examples of such an arrangement are disclosed in U.S. Pat. No. 5,366,336, No. 3,346,131, No. 300,523 and No. 3,119,502. However the arrangements which have been proposed in the past utilise a wheel supported to each side of a central support arm (U.S. Pat. Nos. 5,366,336 and 3,346,131) which requires the use of a multiplicity of axles or support the wheels in a cantilever fashion to one side of a support arm which requires the arm to have sufficient strength to be able to accommodate the stresses created by such cantilevered support as well as the loadings implicit as a result of the load being carried.

The preceding discussion of the background to the invention is intended only to facilitate an understanding of the present invention. It should be appreciated that the discussion is not an acknowledgement or admission that any of the material referred to was part of the common general knowledge in Australia as at the priority date of the application.

DISCLOSURE OF THE INVENTION

Accordingly the invention resides in a load carrying vehicle body comprising a chassis having a forward support and a rearward support, the chassis being adapted to accommodate a load, said rearward support comprising a pair of support members each comprising at least one wheel mounted to one side of a support member, said support members being movable on the chassis between a first position at which the wheels are located within the tracking width of the vehicle and at which the wheels are aligned with the direction of travel of the vehicle and a second position at which the wheels are displaced laterally from the tracking width to provide access to the rear of the chassis, a first locking means provided between the support members, the first locking means adapted to be interengaged when the support members are in the first position to maintain the wheels in the first position and to enable the support members to cooperate with each other in accommodating the stresses and load exerted thereon when in the first position.

According to a preferred feature of the invention a second locking means is provided between each support member and the chassis, the second locking means being engaged when the support members are in the first position to retain the support members in the first position. According to an embodiment of the invention the second locking means also accommodates some of the stresses exerted on the support members when in the first position.

According to a preferred feature of the invention the mounting between the chassis and the support members is articulated to enable the rear of the chassis to be moved from a first position at which the rear end of the chassis is raised from the ground and a second position at which the rear end of the chassis is adjacent to the ground.

According to a preferred feature of the invention, the support members are pivotally mounted to the chassis about an upright axis to enable the wheels to be moved between the first and second position. According to one embodiment the support members each comprise an arm which extends substantially radially from the pivot axis and which support the wheels at a position spaced from the pivot axis.

According to a further preferred feature, two or more wheels are mounted to said one side of each support member. According to one embodiment the at least one wheel is located to the side of each member which is remote from the other support member.

According to a further preferred feature of the invention, said load carrying vehicle body comprises a trailer wherein the forward support comprises a mounting adapted to be supported from a towing vehicle.

The invention will be more fully understood in the light of the following description of several specific embodiments.

BRIEF DESCRIPTION OF THE DRAWINGS

The description is made with reference to the accompanying drawings of which:

FIGS. 6.1, 6.2, 6.3, 6.4 and 6.5 are a schematic illustrations of the step by step procedure involved in loading the trailer vehicle according to the first embodiment;

DETAILED DESCRIPTION OF THE EMBODIMENTS

The first embodiment as shown at FIGS. 1 to 6 is directed to a trailer vehicle 11 which is adapted to be towed behind a towing vehicle 12 which takes the form of a prime mover. The trailer is provided with a chassis 13 which provides a load carrying platform. The chassis is provided at its forward end with a substantially conventional goose-neck portion 14 which is adapted to be mounted to a substantially conventional hitch such as a fifth wheel 15 provided on the towing vehicle 12. The rear of the chassis 13 is supported from pair of rear supports 16.

Each rear support 16 comprises a pair of support arms 17 located to each side of the rear end of the chassis 13. The support arms are mounted to the chassis 13 through an upright pivot 18 which allows the arms 17 to be able to pivot about an upright axis between a first position as shown at FIG. 3 at which they extend in a substantially parallel relationship from the rear of the chassis 13 to a second position as shown at FIG. 5 which they extend to each side of the chassis 13 in opposed relation to each other.

Each support arm 17 supports a pair of wheels 19 which are supported from a common axle extending laterally from the side of the respective arm which is remote from the other arm side of the support arm 17. The sides of the arms which are proximate each other are each provided with an extension 25 which each extend laterally from the respective arm. The outer ends of the extensions are provided with a first and second locking members which are adapted to be lockingly interengagable with each other when the support arms 17 are in the first position and to provide a rigid interconnection between the support arms 17 when they are in the first position in order that the interconnected extensions 25 can accommodate at least some of the torsional loads exerted on the arms as a result of the cantilevered support provided to the wheels by the arms.

Figure 1:
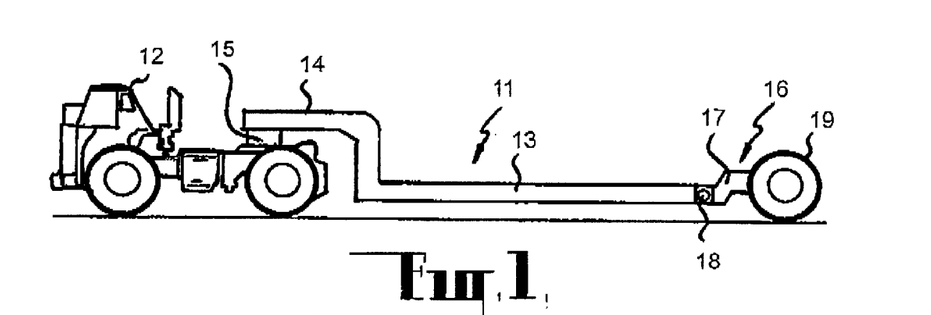
FIG. 1 is a schematic side elevation of a trailer according to the first embodiment where the trailer is supported from a towing vehicle and the chassis is in the raised position.
Figure 2:
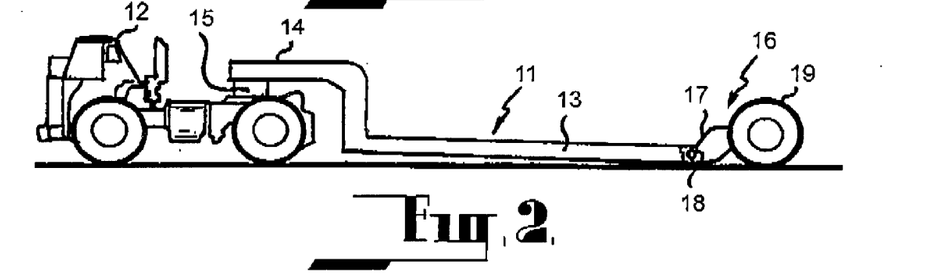
FIG. 2 is a schematic side elevation of the trailer and towing vehicle of FIG. 1 with the chassis in the lowered position.
Figure 3:
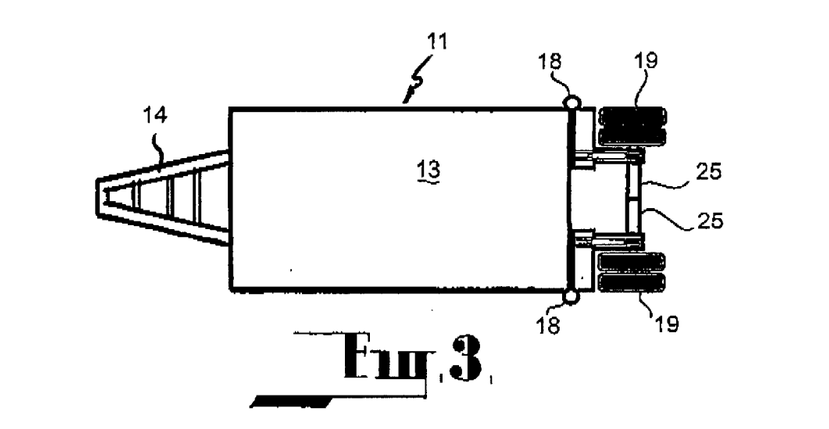
FIG. 3 is a plan view of the trailer with the support members in the first position.
Figure 4:
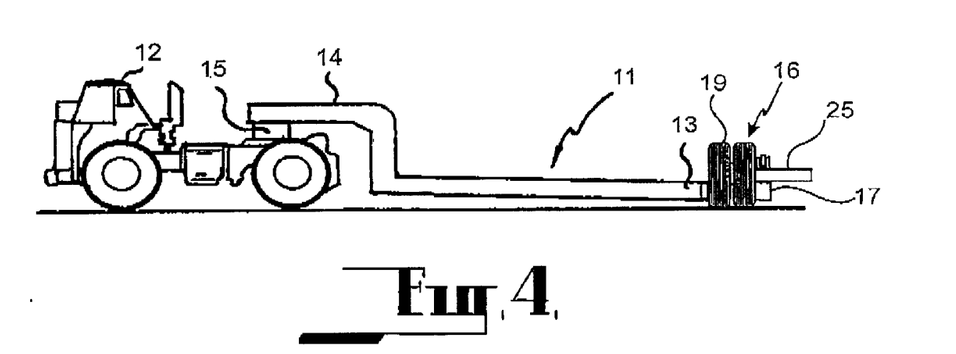
FIG. 4 is a side elevation of the trailer and towing vehicle of FIGS. 1 and 2 showing the support members in the second position.
Figure 5:
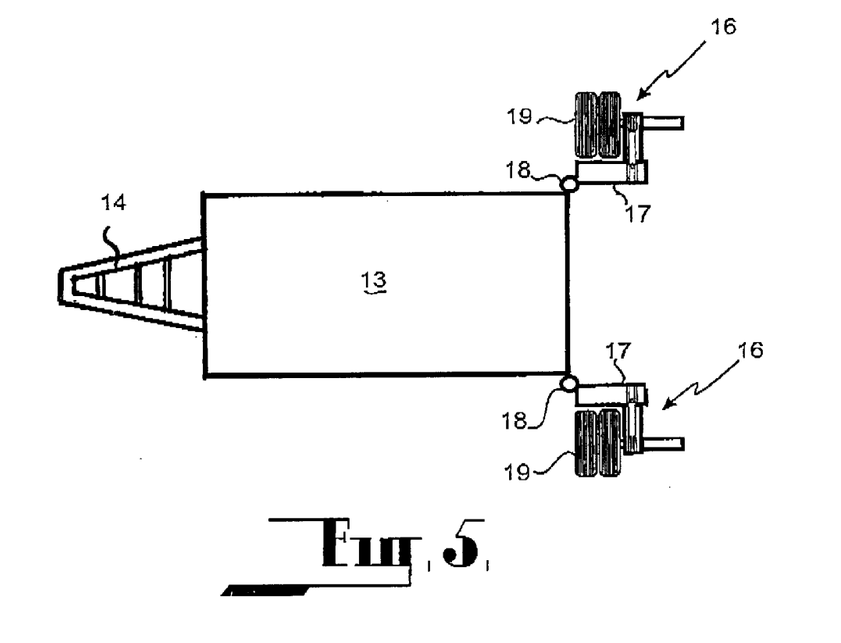
FIG. 5 is a plan view of the trailer of the first embodiment showing the support members in the second position.
Figure 7:
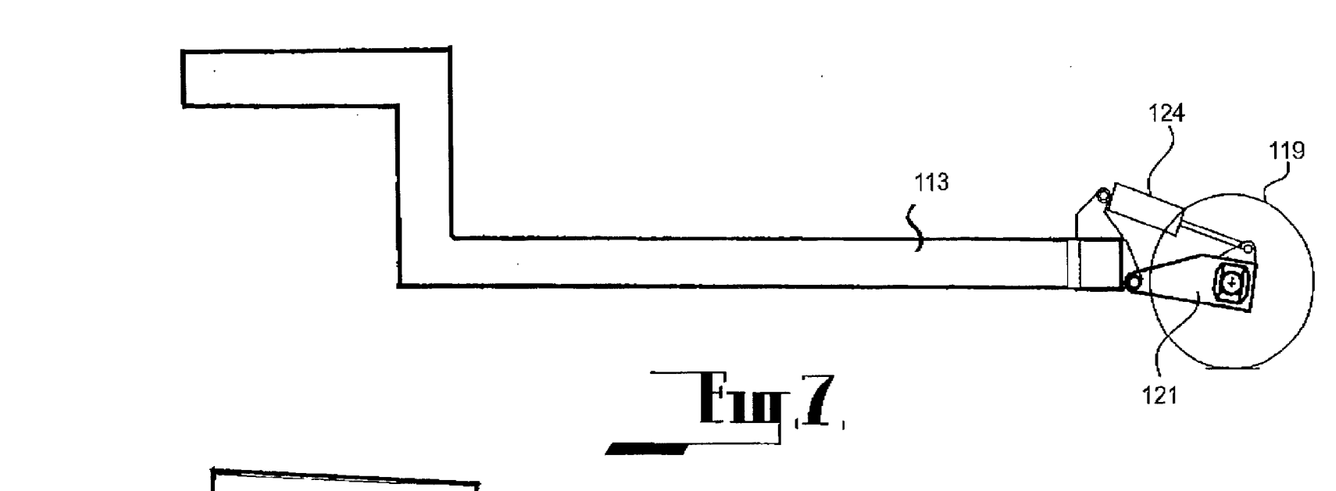
FIG. 7 is a side elevation of the third embodiment with the trailer in the raised position.
Figure 8:
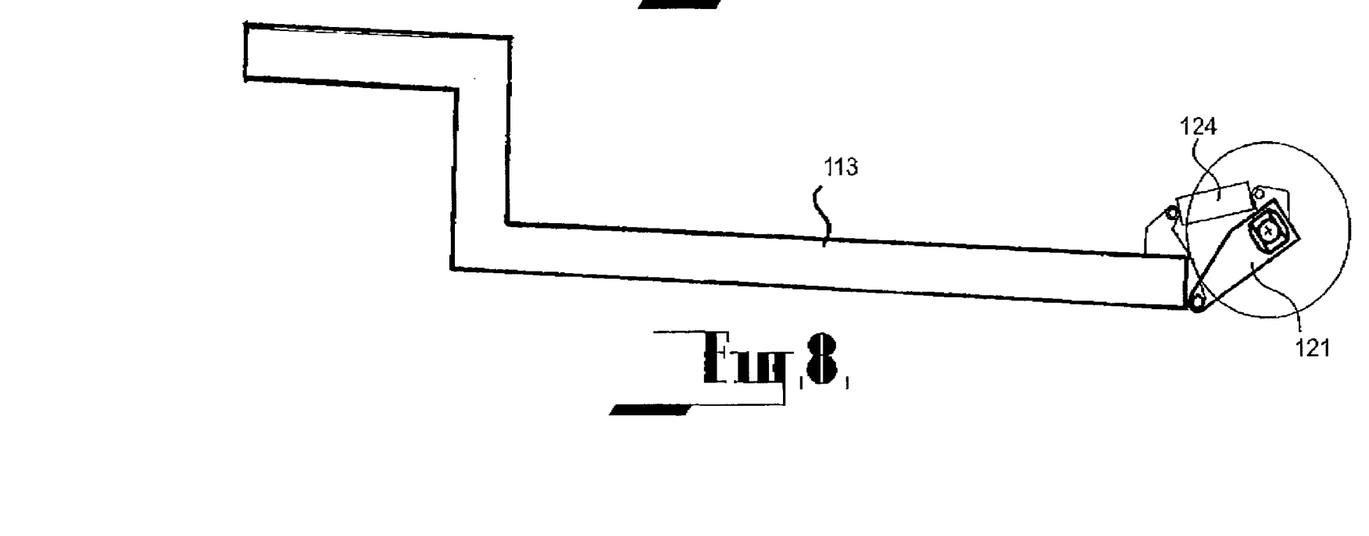
FIG. 8 is a side elevation of the third embodiment with the trailer in the lowered position.

In order to facilitate movement of the support arms between the first position as shown at FIG. 3 and the second position as shown at FIG. 5 a suitable extension means such as a hydraulic ram is mounted between the chassis 13 and each of the support arms 17. In addition, the mounting between the support arms 17 and the chassis 13 is articulated about one or more transverse axes to provide a hinged connection therebetween. A suitable extension means or drive means is provided in association with the articulated mounting to control the hinged movement of the chassis 13 with respect to the support arms 17. As a result of the articulated mounting and the drive means associated with it, the chassis 13 can be lowered from the normal substantially horizontal load carrying position as shown at FIG. 1 to a lowered position shown at FIG. 2 at which the rear end is close to the ground or is supported upon the ground. When the chassis is in the lowered position and the support arms 17 are in their second position as shown at FIGS. 4 and 5, the rear end of the chassis is accessible by a vehicle to enable a load to be deposited onto the chassis 13.

FIGS. 6.1 to 6.5 illustrate the manner in which the trailer body according to the first embodiment can be loaded to support a mobile load in the form of a piece of earthmoving equipment 27. In use the rear end of the load support chassis 13 is lowered from the normal transport position shown at FIG. 6.1 to a lowered position at which it is close to the ground or is in engagement with the ground as shown at FIG. 6.2 by activation of the extension or drive means associated with the articulated mounting between the chassis 13 and the support arm 17. The extensions are then disconnected from each other and the support arms 17 are caused to be moved to their second position as shown at FIG. 6.3 which provides clear access to the rear edge of the support chassis 13. A load can then be moved onto the support chassis 13 over the rear edge platform as shown at FIG. 6.4. Once the load is in position, the support arms 17 are then caused to be moved to the first position, the extensions 25 are then lockingly interconnected and the chassis 13 is raised as shown at FIG. 6.5. The trailer vehicle together with its load 27 can then be towed by the towing vehicle 12.

The first embodiment provides a trailer vehicle which when under load has a substantially conventional tracking width but which can be loaded from the rear end without the need for any ancillary plant or equipment. In addition the use of a common axle to support each set of wheels from the support arm and the interengagement between the arms through the extensions 25 when in the transport position can result in a reduction in the tare weight of the vehicle.

According to a second embodiment (not shown), the movement of the support arms 17 between the first position as shown at FIG. 3 and the second position as shown at FIG. 5 can be effected by movement of the trailer vehicle 11 under the control of the towing vehicle 12. In order to move the support arms 17 between the first position as shown at FIG. 3 and the second position as shown at FIG. 5, the support arms 17 are unlocked from engagement with the chassis 13. In addition the extensions 25 are disengaged. The trailer vehicle is then moved rearwardly which will cause the support arms 17 to rotate about the pivots 18 until they occupy the second position as shown at FIG. 5 at which time the rearward movement of the vehicle can then cease. In order to move the support arms from the second position to the first position the trailer vehicle is moved forwardly which causes the support arms to pivot about the pivots 18 until they trail behind the chassis to occupy the first position.

A third embodiment of the invention is shown at FIGS. 7, 8, 9, 10 and 11 comprises a trailer vehicle of the same form as that of the first embodiment.

In the case of the third embodiment the support arm 117 comprises an elongate arm which is pivotally supported at one end from a pivot 118 located at the respective side of the trailer body whereby the support arm 117 is able to pivot between a position lying closely adjacent to and parallel to the rear face of the trailer and a position extending substantially perpendicularly from the rear face of the trailer body. The support arm 117 is provided with a perpendicularly extending pivot arm 121 which is pivotally supported from a longitudinally directed pivot pin provided at an intermediate position along the length of the support arm 117 such that it pivots about a substantially horizontal axis. The pivotal movement of the pivot arm 117 about the upright pivot axis 118 is effected by means of a first hydraulic cylinder 123 which extends between the side of the trailer body 113 and a radial arm provided on the upright pivot 118 whereby on the retraction and extension of the first hydraulic cylinder 123 the support arm 117 is caused to move between its tracking position as shown at FIG. 9 and its loading position as shown at FIG. 10.

Figure 9:
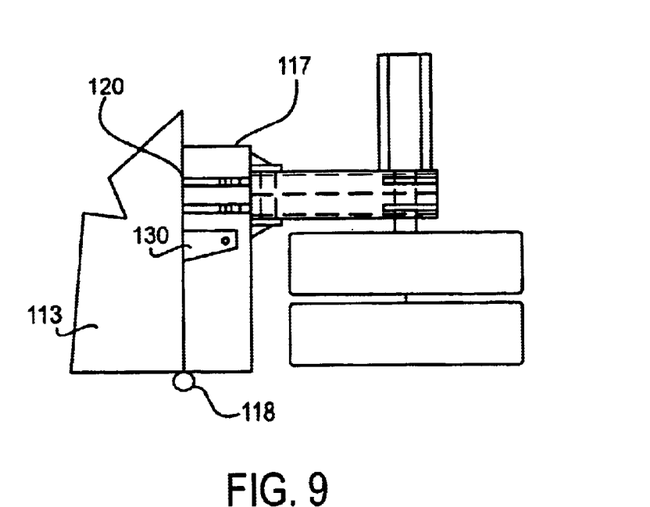
FIG. 9 is a partial plan of the third embodiment showing one set of wheels in the tracking position.
Figure 10:
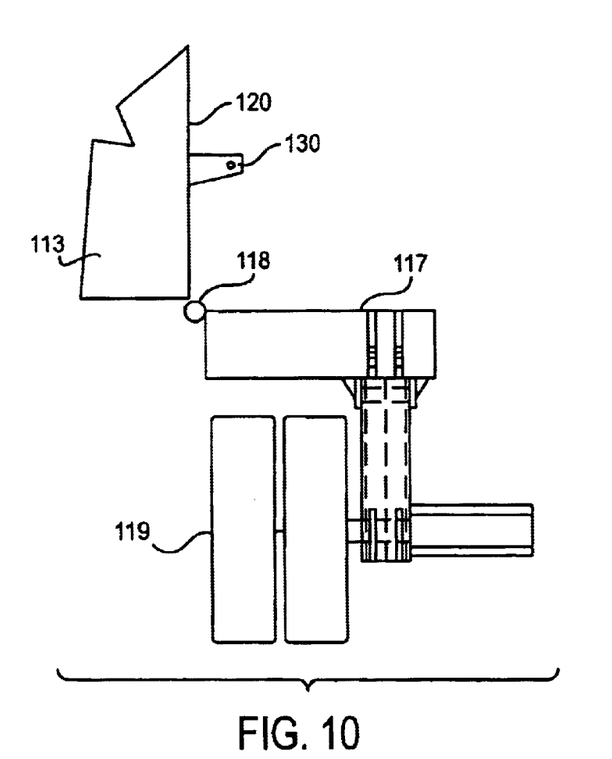
FIG. 10 is a partial plan of the third embodiment showing one set of wheels in the loading position.
Figure 11:
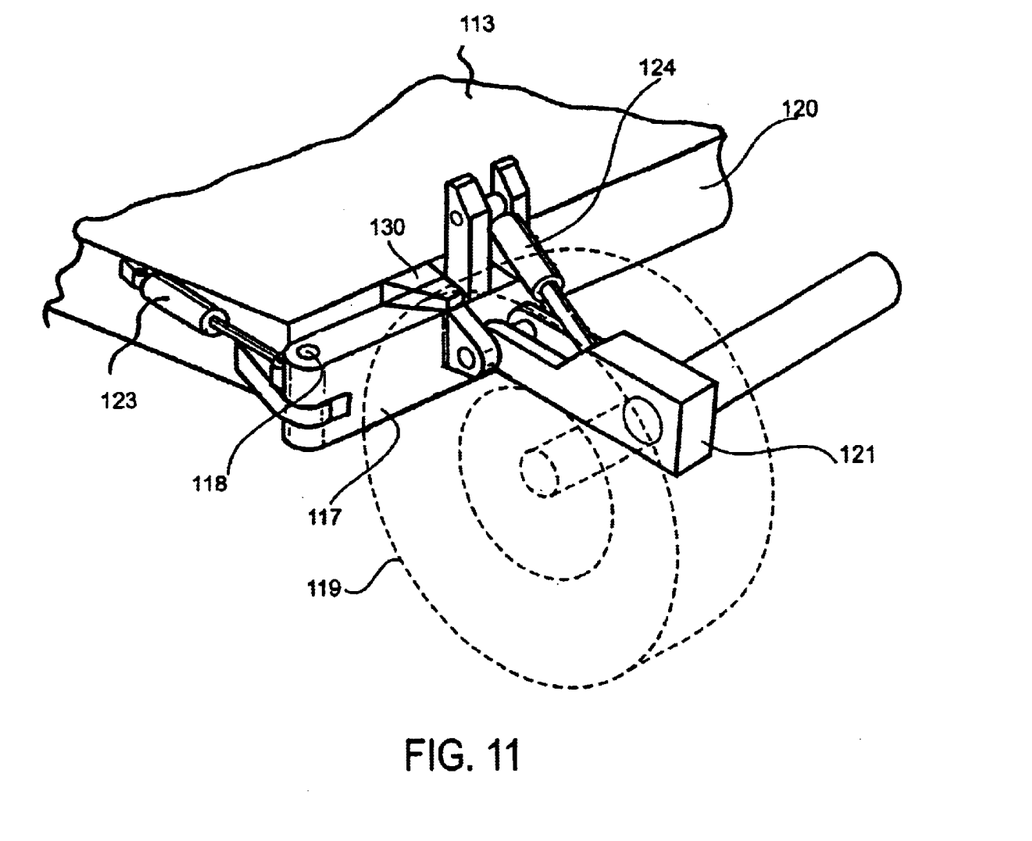
FIG. 11 is a partial isometric view of one of the wheel mountings according to the third embodiment.
Figure 61:
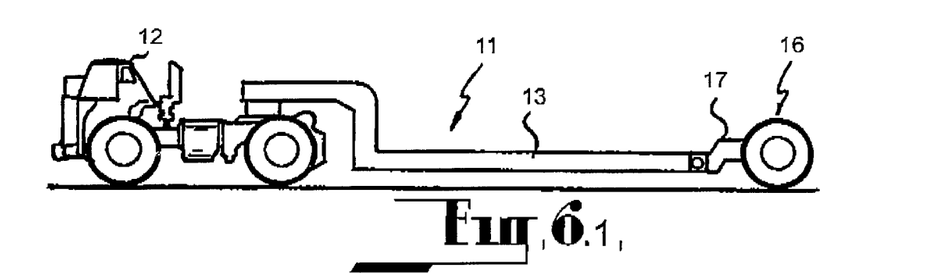
Figure 62:
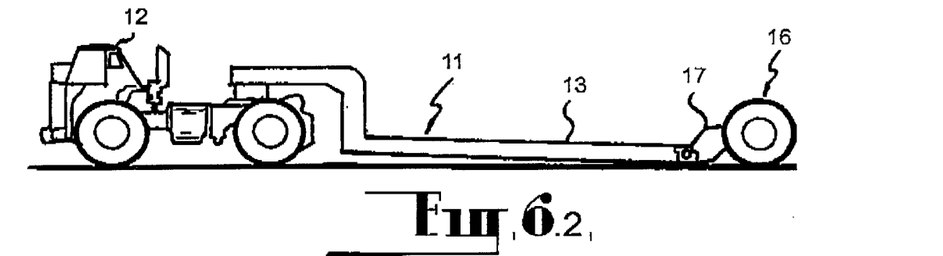
Figure 63:
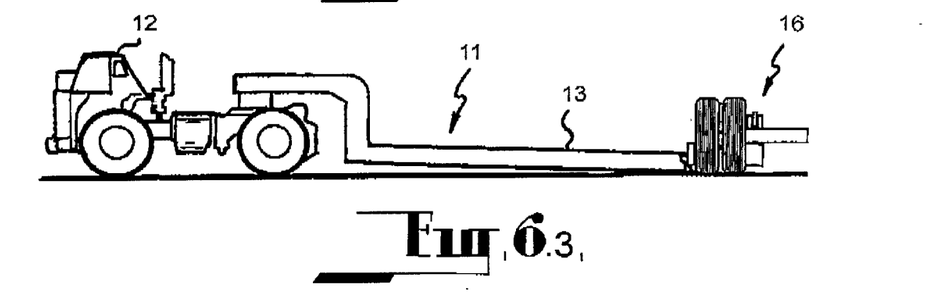
Figure 64:
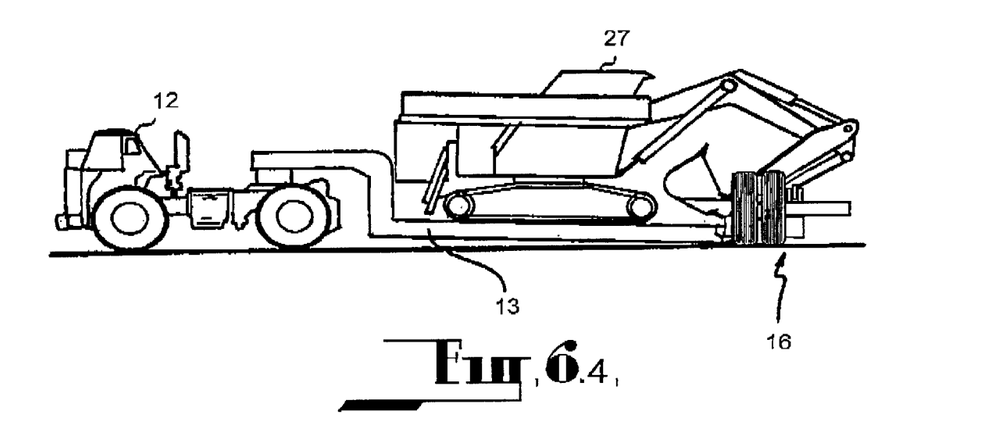
Figure 65:
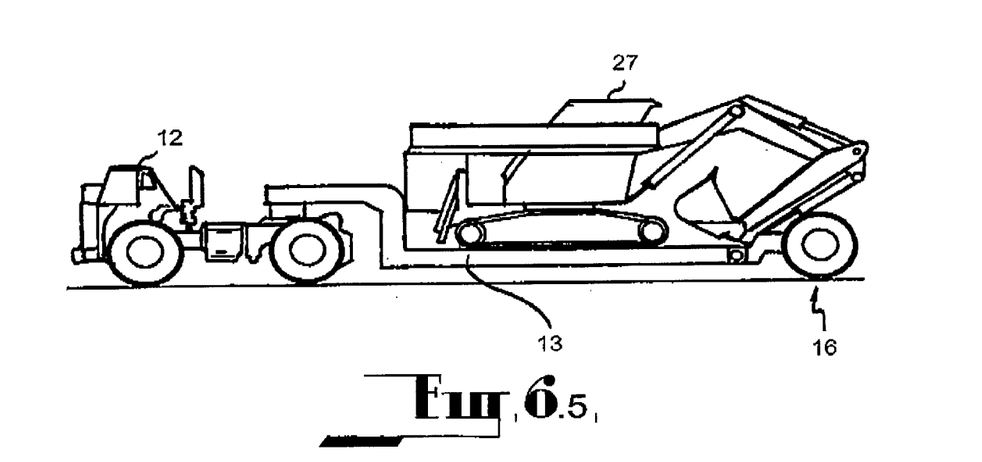

The support arms 117 have extensions fixedly disposed at second ends of said support arms 117, said extensions being of a length such that when the pivot arms are in their tracking position as shown at FIG. 9 the free ends of each of the extensions are interengaged and the first and second locking members provided at those ends can be locked into such interengagement by means of a suitable locking pin. In addition, a further locking means is provided between the chassis 113 and each of the support arms 117. Said locking means comprises a third and a fourth locking member 130 disposed on said chassis 113. The 3rd locking member 130 is lockingly engagable with the second end of one support arm 117, and the 4th locking member 130 is lockingly engagable with the second end of the other support arm 117. The 3rd and 4th locking members 130 each comprise a support bracket or lug on the chassis which are engaged by the respective second ends on each respective support member. Therefore, when the support arms are in their tracking position, the second end of each support arm 117 is engaged with a corresponding support bracket or lug provided on the chassis 113 and are lockingly engaged with that lug or bracket such that the arms are fixed in position relative to the trailer body 113.

In order to control the pivotal movement of the rear face 120 of the trailer body relative to the ground a second hydraulic cylinder 124 is provided between the support arm 117 and the pivot arm 121 whereby extension or retraction of the second hydraulic cylinder will cause pivotal movement of the pivot arm 121 on the support arm 117 in order to effect the lowering or raising of the rear end of the trailer body 113 as desired.

The third embodiment provides a means for positively effecting the transposition of the support arm 117 from its tracking position to its raised position and also controlling the lowering and raising of the trailer body 113.

It is anticipated that in utilisation of the third embodiment it may be appropriate to initially retract the second hydraulic cylinders 124 in order to lower the rear end of the trailer body into contact with the ground and to relieve at least some if not almost all of the weight from the wheels 119. The first hydraulic cylinders 123 can then be retracted in order to effect the pivotal movement of the support arms about the upright pivot axis 118 to move the support arms to their loading position as shown at FIG. 10.

According to a further embodiment of the invention the support arms may be mounted to the trailer body in the manner described in relation to each of the above embodiments. However, in order to be able to pivot about an upright axis there is no means for effective pivotal movement between the wheels and the support arm about a horizontal axis, The effect of such is that the rear end of the trailer body cannot be lowered. In order to effect loading of the embodiment the trailer body is provided with appropriate ramps to effect the transfer of a load from the ground onto the rear of the trailer body when the wheels are in the loading position.

A further embodiment of the invention comprises a variation of the first embodiment in which the extension means which causes the movement of the arms between the first and second position is mounted between each of the support arms 17.

Throughout this specification (including the claims if present), unless the context requires otherwise, the word "comprise", or variations such as "comprises" or "comprising", will be understood to imply the inclusion of a stated integer or group of integers but not the exclusion of any other integer or group of integers.

It should be appreciated that the scope of the present invention need not be limited to the particular scope of the embodiments described above.

The claims defining the invention are as follows:

1. A load carrying vehicle body comprising:
   a chassis having a forward support and a rearward support, the chassis being adapted to accommodate a load;
   said rearward support comprising first and second support members;
   a first end of said first support member pivotably supported about a first pivot substantially proximate to a first corner of the chassis;
   a second end of said first support member rotatably supporting a first wheel having a first axis of rotation;
   a first end of a first extension fixedly disposed at said second end of said first support member, said first extension being substantially coaxial with said first axis of rotation;
   a first end of said second support member pivotably supported about a second pivot substantially proximate to a second corner of the chassis;
   a second end of said second support member rotatably supporting a second wheel having a second axis of rotation;
   a first end of a second extension fixedly disposed at said second end of said second support member, said second extension being substantially coaxial with said second axis of rotation;
   said first and second support members each having a first position at which the first and second axes of rotation are substantially normal to a direction of travel of the vehicle;
   said first and second support members each having a second position at which each of the first and second wheels are pivoted about said first and second pivots to provide access to a rear of the chassis;
   a first locking member provided at a second end of said first extension; and
   a second locking member provided at a second end of said second extension;
   wherein when the first and second support members are in the first position said first locking member is lockably engaged with said second locking member to maintain the wheels in the first position and to enable the support members to cooperate with each other in accommodating stresses and loads exerted thereon when in the first position.

2. A load carrying vehicle body as claimed at claim 1 comprising a support on the chassis, wherein the second ends of the first and second support members locking lockingly engage with the support when the first and second support members are in their first position.

3. A load carrying vehicle body as claimed at claim 2 wherein a rear of the chassis has a raised position in which the rear of the chassis is raised from a ground and a lowered position in which the rear of the chassis is adjacent to the ground.

4. A load carrying vehicle body as claimed at claim 3 wherein, the first pivot comprises a first upright axis; and the second pivot comprises a second upright axis.

5. A load carrying vehicle body as claimed at claim 4 wherein the first support member comprises an arm which extends substantially radially from the first upright axis and which supports the first wheel at a position spaced from the first upright axis; and the second support member comprises an arm which extends substantially radially from the second upright axis and which supports the second wheel at a position spaced from the second upright axis.

6. A load carrying vehicle body as claimed at claim 2 wherein, the first pivot comprises a first upright axis; and the second pivot comprises a second upright axis.

7. A load carrying vehicle body as claimed at claim 6 wherein the first support member comprises an arm which extends substantially radially from the first upright axis and which supports the first wheel at a position spaced from the first upright axis; and the second support member comprises an arm which extends substantially radially from the second upright axis and which supports the second wheel at a position spaced from the second upright axis.

8. A load carrying vehicle body as claimed at claim 2 wherein said first wheel comprises at least one wheel mounted to a side of said first support member; and said second wheel comprises at least one wheel mounted to a side of said second support member.

9. A load carrying vehicle body as claimed at claim 8 wherein the side of said first support member is remote from the second support member; and the side of said second support member is remote from the first support member.

10. A load carrying vehicle body as claimed at claim 2 wherein said load carrying vehicle body comprises a trailer wherein the forward support comprises a mounting adapted to be supported from a towing vehicle.

11. A load carrying vehicle body as claimed at claim 1 wherein a rear of the chassis has a raised position in which the rear of the chassis is raised from a ground and a lowered position in which the rear of the chassis is adjacent to the ground.

12. A load carrying vehicle body as claimed at claim 11 wherein, the first pivot comprises a first upright axis; and the second pivot comprises a second upright axis.

13. A load carrying vehicle body as claimed at claim 12 wherein the first support member comprises an arm which extends substantially radially from the first upright axis and which supports the first wheel at a position spaced from the first upright axis; and the second support member comprises an arm which extends substantially radially from the second upright axis and which supports the second wheel at a position spaced from the second upright axis.

14. A load carrying vehicle body as claimed at claim 11 wherein said first wheel comprises at least one wheel mounted to a side of said first support member; and said second wheel comprises at least one wheel mounted to a side of said second support member.

15. A load carrying vehicle body as claimed at claim 14 wherein the side of said first support member is remote from the second support member; and the side of said second support member is remote from the first support member.

16. A load carrying vehicle body as claimed at claim 11 wherein said load carrying vehicle body comprises a trailer wherein the forward support comprises a mounting adapted to be supported from a towing vehicle.

17. A load carrying vehicle body as claimed at claim 1 wherein, the first pivot comprises a first upright axis; and the second pivot comprises a second upright axis.

18. A load carrying vehicle body as claimed at claim 17 wherein the first support member comprises an arm which extends substantially radially from the first upright axis and which supports the first wheel at a position spaced from the first upright axis; and the second support member comprises an arm which extends substantially radially from the second upright axis and which supports the second wheel at a position spaced from the second upright axis.

19. A load carrying vehicle body as claimed at claim 18 wherein said first wheel comprises at least one wheel mounted to a side of said first support member; and said second wheel comprises at least one wheel mounted to a side of said second support member.

20. A load carrying vehicle body as claimed at claim 19 wherein the side of said first support member is remote from the second support member; and the side of said second support member is remote from the first support member.

21. A load carrying vehicle body as claimed at claim 18 wherein said load carrying vehicle body comprises a trailer wherein the forward support comprises a mounting adapted to be supported from a towing vehicle.

22. A load carrying vehicle body as claimed at claim 17 wherein said first wheel comprises at least one wheel mounted to a side of said first support member; and said second wheel comprises at least one wheel mounted to a side of said second support member.

23. A load carrying vehicle body as claimed at claim 22 wherein the side of said first support member is remote from the second support member; and the side of said second support member is remote from the first support member.

24. A load carrying vehicle body as claimed at claim 17 wherein said load carrying vehicle body comprises a trailer wherein the forward support comprises a mounting adapted to be supported from a towing vehicle.

25. A load carrying vehicle body as claimed at claim 1 wherein said first wheel comprises at least one wheel mounted to a side of said first support member; and said second wheel comprises at least one wheel mounted to a side of said second support member.

26. A load carrying vehicle body as claimed at claim 25 wherein the side of said first support member is remote from the second support member; and the side of said second support member is remote from the first support member.

27. A load carrying vehicle body as claimed at claim 25 wherein said load carrying vehicle body comprises a trailer wherein the forward support comprises a mounting adapted to be supported from a towing vehicle.

28. A load carrying vehicle body as claimed at claim 1 wherein said load carrying vehicle body comprises a trailer wherein the forward support comprises a mounting adapted to be supported from a towing vehicle.

* * * * *